US 6,711,991 B2

(12) United States Patent
Tomatis

(10) Patent No.: US 6,711,991 B2
(45) Date of Patent: Mar. 30, 2004

(54) DOUGH-FLATTENING APPARATUS FOR THE PREPARATION OF THIN PIZZAS

(75) Inventor: Stefano Tomatis, Peveragno (IT)

(73) Assignee: CMT Costruzioni Meccaniche e Tecnologia S.p.A., Peveragno (IT)

( * ) Notice: Subject to any disclaimer, the term of this patent is extended or adjusted under 35 U.S.C. 154(b) by 0 days.

(21) Appl. No.: 10/276,877

(22) PCT Filed: May 8, 2001

(86) PCT No.: PCT/IB01/00781

§ 371 (c)(1),
(2), (4) Date: Feb. 6, 2003

(87) PCT Pub. No.: WO01/87072

PCT Pub. Date: Nov. 22, 2001

(65) Prior Publication Data

US 2003/0145742 A1 Aug. 7, 2003

(30) Foreign Application Priority Data

May 19, 2000 (IT) ...................................... TO2000A0457

(51) Int. Cl.[7] .............................. A23L 1/00; A21C 3/02; A21C 9/00; A21C 11/00; A21C 11/06
(52) U.S. Cl. ............................ 99/353; 99/349; 99/427; 99/443 R; 99/450.1; 99/450.6; 99/450.7
(58) Field of Search ........................... 99/349, 352–355, 99/450.1, 450.6, 450.7, 450.2, 423, 427, 432, 348, 372–380, 443 C, 443 R; 100/303; 118/18, 25, 411; 141/183; 222/270, 288, 360, 380, 486, 585, 307, 334; 426/27, 279, 280, 496, 523, 512; 425/162, 152, 168, 167, 360, 394, 429, 437, 183, 193, 364 R, 403, DIG. 47, DIG. 106

(56) References Cited

U.S. PATENT DOCUMENTS

| 4,514,089 | A | | 4/1985 | Meynet | |
|---|---|---|---|---|---|
| 4,857,349 | A | | 8/1989 | Finlay | |
| 5,417,149 | A | * | 5/1995 | Raio et al. | ..................... 99/349 |
| 6,067,897 | A | * | 5/2000 | Gieco | ........................... 99/353 |
| 6,363,838 | B1 | * | 4/2002 | Tomatis | ....................... 99/353 |

FOREIGN PATENT DOCUMENTS

| FR | 2 455 479 | 12/1980 |
|---|---|---|
| WO | WO 00/42857 | 7/2000 |

OTHER PUBLICATIONS

Database WPI—Abstract XP–002173236 (AVTO–R) Avtomatika Prodn As "Dough–Pieces Rolling–Out Equipment—has Several Tables for Dough, Rotatable in Two Modes, Surmounted by Conical Rolling–Pins, and Mounted on Shafts" May 15, 1989.

* cited by examiner

*Primary Examiner*—Timothy P. Simone
(74) *Attorney, Agent, or Firm*—Browdy and Neimark

(57) ABSTRACT

A flattening roller (38) is supported on horizontal guides (32, 34) and rolls alternately in opposite directions along the guides. A tray (30) is arranged horizontally between the guides, and is progressively lifted to approach to the cylindrical surface of the roller. The tray turns by a quarter turn around a vertical axis at the end of each stroke of the roller along the guides. A lump of dough placed on the tray is progressively flattened to a thin, round shape.

12 Claims, 3 Drawing Sheets

DOUGH-FLATTENING APPARATUS FOR THE PREPARATION OF THIN PIZZAS

This invention is concerned with a dough-flattening apparatus for the preparation of thin pizzas from lumps of flour-dough in the shape of globular lumps or loaves, and more particularly the invention is concerned with a dough-spreading apparatus which can operate completely automatically, so that it can be incorporated in an automated system for preparing and baking pizzas ready for consumption.

WO-IB00/00023, now WO 00/42857, discloses an apparatus wherein globular lumps of newly kneaded dough go through successive handling stations where the lumps are flattened, spread with desired dressings and finally baked. The flattening station is a tray that is brought down onto the dough for flattening, while spinning around to promote flattening. Such a dough-flattening process is only capable of making relatively thick pizzas, and does not easily lend itself to produce thin pizzas, say of only a few millimeters thickness, such as are in agreement with the Italian taste.

Other mechanical devices are also known, by which newly kneaded dough can be spread or flattened to prepare pizzas. Some of them produce a thin, ribbon-shaped sheet, from which a round pizza can be obtained by cutting or trimming; however, a cut edge is less satisfactory than a whole edge, the latter being typical of hand-flattened pizzas made from a small loaf.

The main object of the invention is therefore to provide a dough-spreading apparatus for the preparation of pizzas, which is capable of reducing the dough to a sheet as thin as desired, in a fully automatic way, so that it can be easily incorporated in a system such as disclosed in the above-mentioned WO-IB00/00023, now WO 00/42857.

Another object is to provide such apparatus so that it produces substantially round thin pizzas, without a need for trimming.

Another object is to provide such apparatus so that it produces pizzas having an adjustable thickness.

The invention achieves the above and other objects and advantages, such as will appear from the following disclosure, by a dough-flattening apparatus for the preparation of thin pizzas having the features recited in claim 1.

Other advantageous features of the invention are recited in the subordinate claims.

A preferred embodiment of the invention is described below in more detail, with reference to the attached drawings, wherein.

Figure 1:
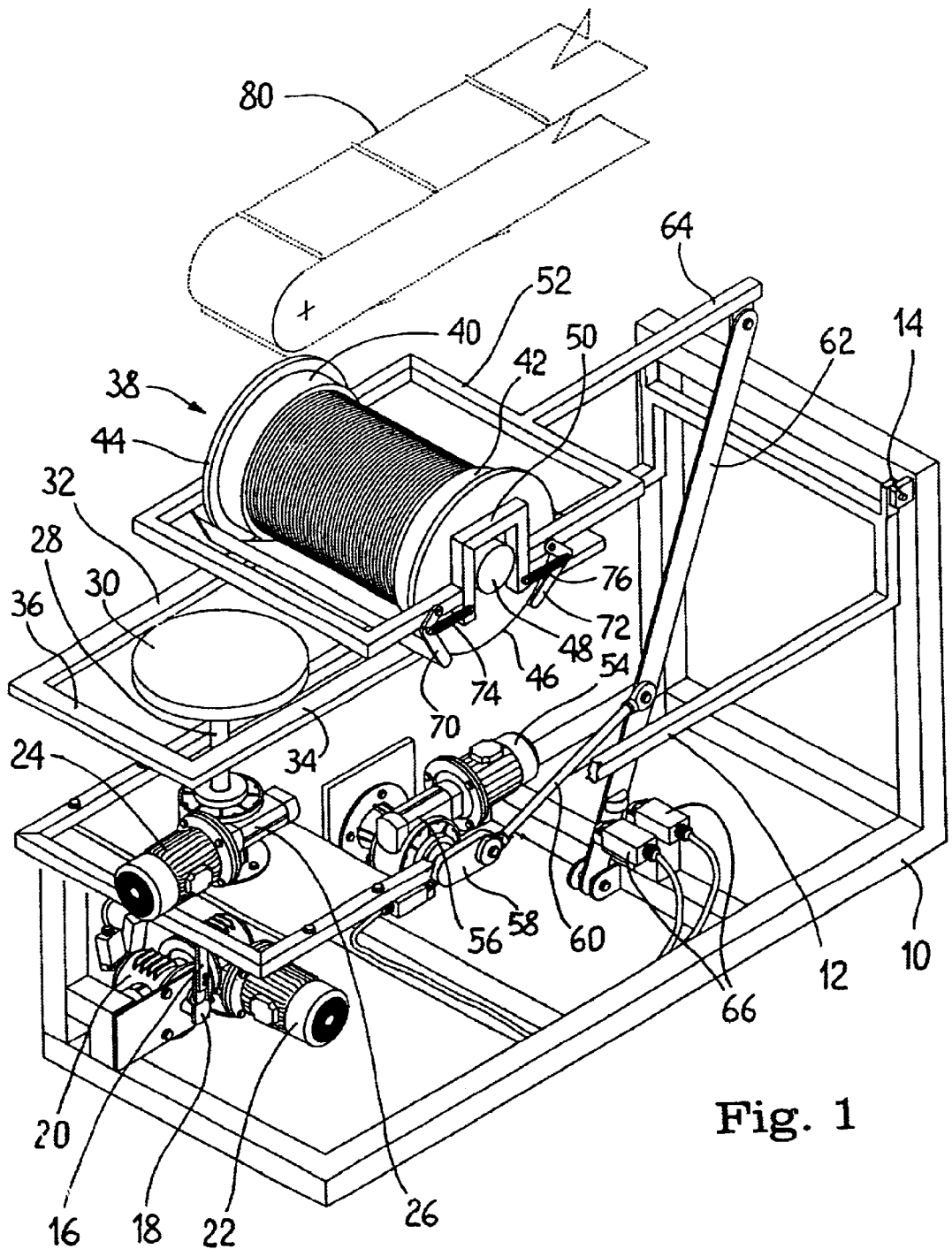
FIG. 1 is a perspective view of a dough-flattening apparatus according to a preferred embodiment of the invention.
Figure 2:
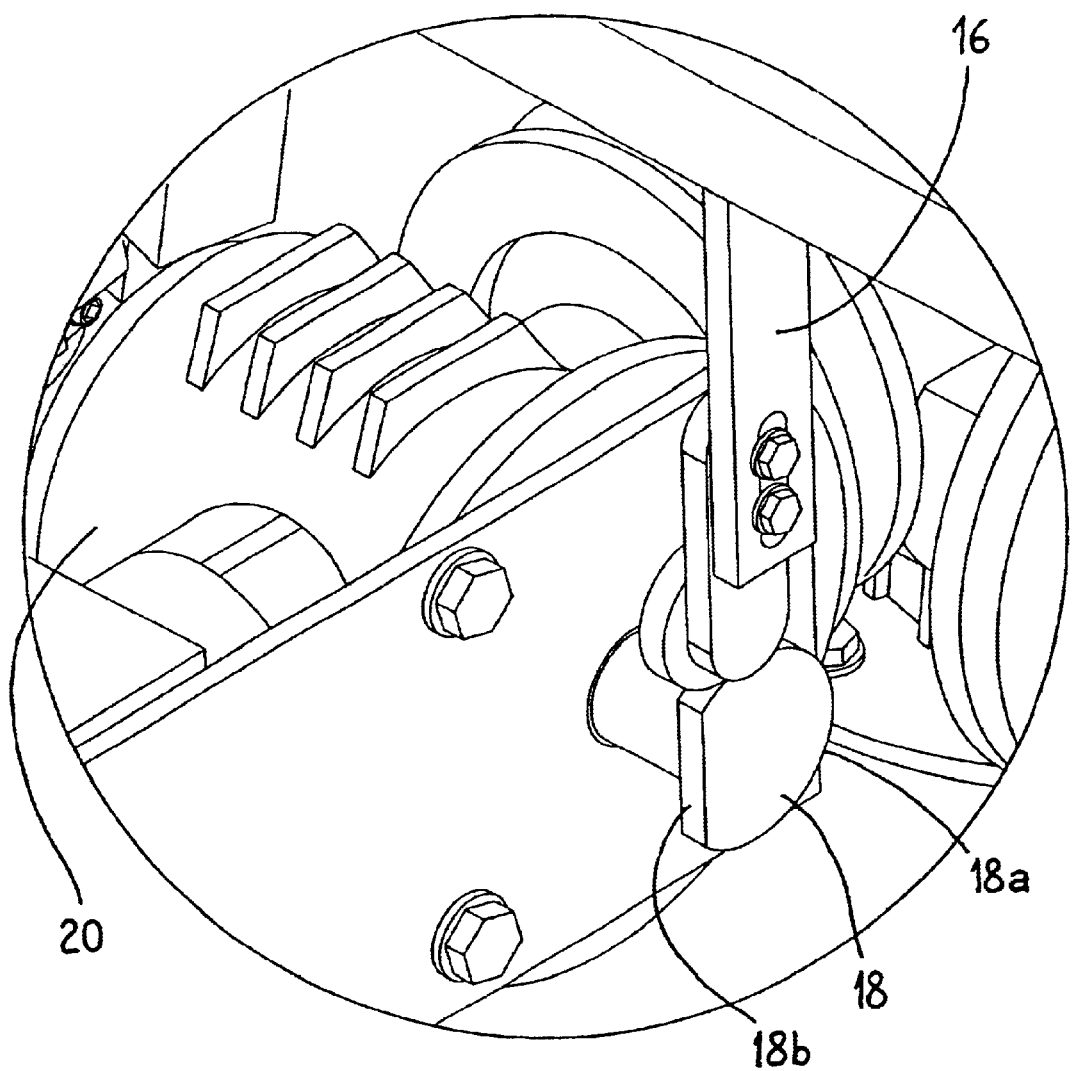
FIG. 2 is an enlarged, perspective view of a detail of the apparatus of FIG. 2.

With reference to FIG. 1, a base 10 has a bracket 12 which is hinged to the base in 14. A tappet 16 downwardly projecting from bracket 12 (see also FIG. 2) rests on a cam 18 driven by a gear 20, which is itself driven by an electric motor 22. Cam 18 has a spiral profile 18a and a flat 18b, so that during rotation it progressively lifts tappet 16, and therefore bracket 12, and then allows it to drop again to its starting level when flat 18b is reached.

Bracket 12 carries an electric motor 24 at its movable end. Motor 24, through a reduction gear 26, drives a vertical shaft 28 having a tray 30 at its upper end. Tray 30 is surrounded by a frame comprising two parallel side members 32, 34, extending lengthwise to base 10, and two interconnecting cross members such as 36. Frame 32, 34, 36 is in a stationary position with respect to the base, e.g. connected to it by uprights not shown.

A roller 38, preferably of a polymeric material, has cylindrical rolling surfaces 40, 42, resting on side members 32, 34, respectively, as well as retaining flanges 44, 46, so that roller 38 can roll on side members 32, 34 while being retained on them. Roller 38 further has respective hubs such as 48 at its opposite ends, which are encased in respective yokes such as 50, the latter being integral with a horizontal frame 52.

Frame 52 can be driven to perform an alternative, horizontal motion, parallel to side members 32, 34, by an electric motor 54 having a reduction gear 56, through a crank gear comprising a crank 58 and a connecting rod 60. Crank gear 58, 60 drives an arm 62 in an alternating motion, arm 62 being pivoted to base 10 and hinged at the opposite end to a projection 64 of frame 52.

Two proximity sensors 66 are mounted for detecting two end positions of arm 62 and for supplying corresponding signals to an electronic control (not shown) for purposes that are explained below.

The above described apparatus operates as follows. At its starting position, cam 18 is turned with its flat 18b facing upwards, and, consequently, bracket 12 is in its lowest position. The height of shaft 28 is designed so that the upper surface of tray 30, under these circumstances, is a few centimeters below the level of side members 32, 34. A loaf of dough (not shown) is dropped on tray 30 from a distributor such as conveyor belt 80, shown in dotted lines on FIG. 1. From these conditions, the crank gear driving roller 38 moves frame 52 leftward on FIG. 1, and the roller presses the loaf of dough, so that its thickness is reduced to the difference between the height of tray 30 and side members 32, 34. The loaf is also stretched to an oval shape having its major axis lengthwise to the roller stroke.

The electronic control, when the completion of the stroke is detected, steps cam 18 forward, so that bracket 12 is lifted a few millimeters, and, at the same time, turns the tray through a rotation angle of about a quarter turn. Then, frame 52 is driven back by driving mechanism 54–62 to bring the roller back, so that it rolls on top of the loaf in the opposite direction. By this action, roller 38 further presses the dough, flattening its further by a few millimeters, and moreover, since the tray has been turned by a quarter turn, the dough is flattened across the previous direction of stretch, so that it will take up a substantially round shape again.

The above cycle is repeated several times, and, at each stroke of the roller, tray 30 is lifted to make the dough thinner and, due to the rotation of 90°, to insure that the dough is brought back to a round shape after each to and fro.

When the flattening process is completed, the pizza can be picked up from the tray by any appropriate means, e.g. by a device as disclosed in Italian Patent Application No. TO2000 A000458, filed on May 19, 2000, published under WO 01/87073.

Figure 4:
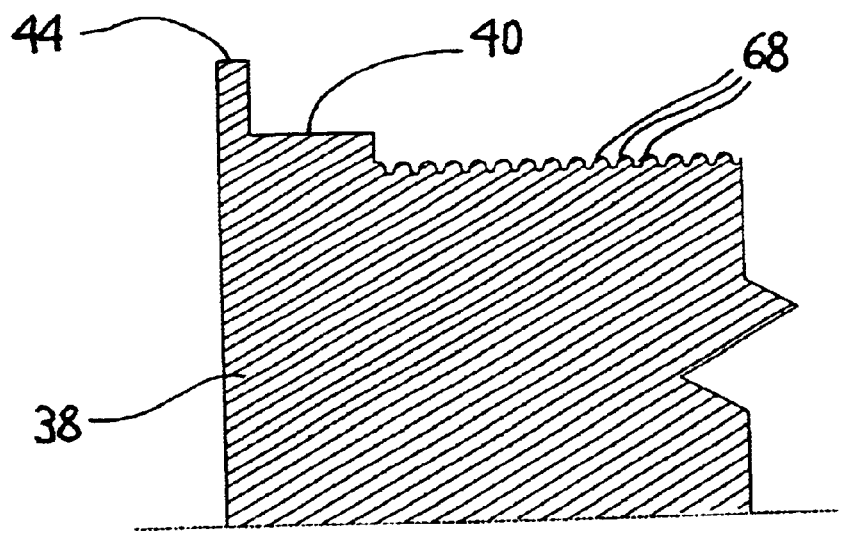
FIG. 4 is a further enlarged, partial view in longitudinal cross-section of a fragment of the roller FIG. 3.

Preferably, as best shown on FIG. 4, the cylindrical flattening surface of roller 30 is scored with dense grooves 68, having a depth of about 2 mm. By this device, the dough being pressed is finely scored, and when, after a 90° rotation of tray 30, the roller presses on it again, the scoring reduces the elastic return of the dough and promotes its flattening. In other words, the scoring acts on the dough to break its fibers and thereby to reduce their returning action, and, moreover, it increases the overall surface area of the pizza, in preparation to the next flattening step, which takes place across the scoring of the dough, due to its 90° rotation. It should be apparent that the scoring promotes an effective flattening of the dough.

Figure 3:
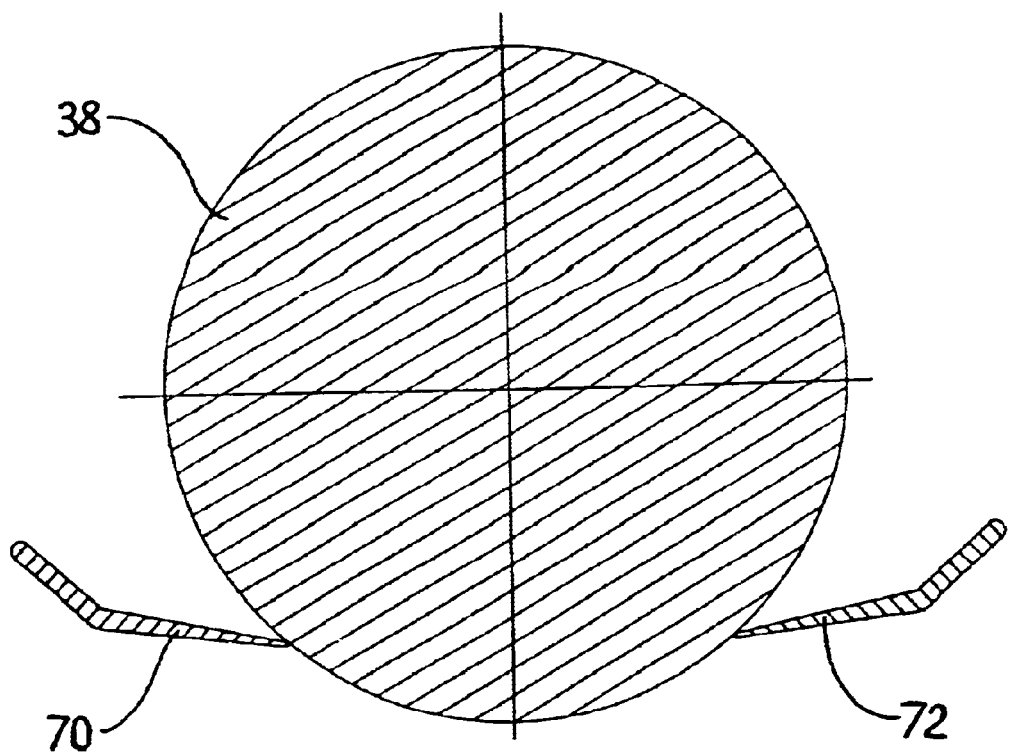
FIG. 3 is an enlarged view in transverse cross-section of a dough-flattening roller that is part of the apparatus of FIG. 1.

Moreover, as seen on FIGS. 1 and 3, two scraper blades 70, 72 are mounted on frame 52. Scraper blades 70, 72 are biased by respective springs 74, 76 to obliquely press their edges against the cylindrical surface of roller 30, so that they will scrape the dough off in case it should stick to the roller.

In practice, the rotation of the tray after each passage of the roller might be different from the theoretical quarter turn suggested above. In fact, the practice has shown that, if the number of strokes is large enough, the progressive rotations lead in any case to a uniform flattening of the dough in a round shape.

It is understood that the preferred embodiment of the apparatus as described above is liable to changes, which will obvious for the person skilled in the art. By way of example, the tray lifting mechanism could be replaced with other equivalent, known devices, such as a lead screw arrangement. The driving mechanism of frame 52, which moves roller 38, could also be replaced with another known to-and-fro device. The above and other changes should be regarded as falling within the idea of the invention.

What is claimed is:

1. A dough-flattening apparatus for the preparation of thin pizzas from globular dough lumps, characterized in that it comprises a flattening roller supported on horizontal guides and connected with a first motor to drive it in an alternating rolling motion in opposite directions along said guides, and having a cylindrical flattening surface extending between said guides, said roller defining a lower limit of said cylindrical surface;

a tray arranged horizontally between said horizontal guides, and supported by a second motor for progressively lifting the tray from a starting height lower than the lower limit of the cylindrical surface of the roller, and provided with a third motor for turning the tray by a fractional turn around a vertical axis at the end of each stroke of the roller along said guides.

2. The dough-flattening apparatus of claim 1, characterized in that said roller is encased in a frame connected to one end of an arm pivoted to a stationary point and driven by a motor through a crank gear to perform an alternating motion.

3. The dough-flattening apparatus of claim 1, characterized in that the tray is supported on a movable support having a tappet vertically following a cam driven in rotation by said second motor.

4. The dough-flattening apparatus of claim 3, characterized in that said movable support is a bracket hinged at one end to a base of the apparatus and carrying the tray and said tappet at its opposite end.

5. The dough-flattening apparatus of claim 1, characterized in that the cylindrical flattening surface of the roller is finely scored or grooved in a peripheral direction.

6. The dough-flattening apparatus of claim 5, characterized in that a pair of scraper blades press obliquely against the flattening surface of the roller, from opposite sides with respect to the area of contact with the dough, under the bias of elastic means.

7. The dough-flattening apparatus of claim 2, characterized in that the tray is supported on a movable support having a tappet vertically following a cam driven in rotation by said second motor.

8. The dough-flattening apparatus of claim 7, characterized in that said movable support is a bracket hinged at one end to a base of the apparatus and carrying the tray and said tappet at its opposite end.

9. The dough-flattening apparatus of claim 2, characterized in that the cylindrical flattening surface of the roller is finely scored or grooved in a peripheral direction.

10. The dough-flattening apparatus of claim 9, characterized in that a pair of scraper blades press obliquely against the flattening surface of the roller, from opposite sides with respect to the area of contact with the dough, under the bias of elastic means.

11. The dough-flattening apparatus of claim 3, characterized in that the cylindrical, flattening surface of the roller is finely scored or grooved in a peripheral direction.

12. The dough-flattening apparatus of claim 5, characterized in that a pair of scraper blades press obliquely against the flattening surface of the roller, from opposite sides with respect to the area of contact with the dough, under the bias of elastic means.

* * * * *